INVENTORS.
Emmett S. Watson
BY Michael J. O'Neill

Harold E. Chamblett Jr.
ATTORNEY.

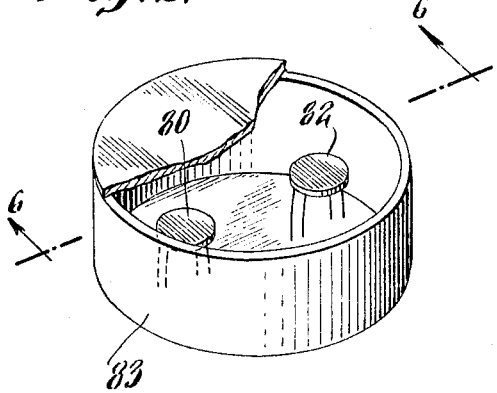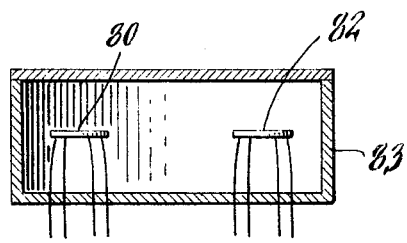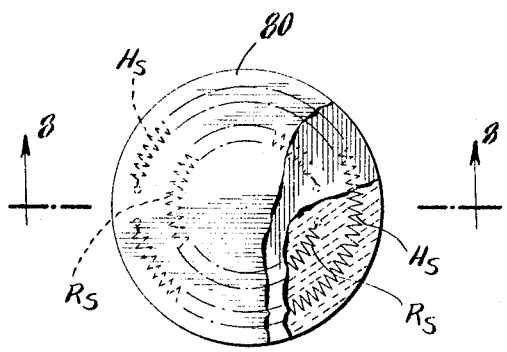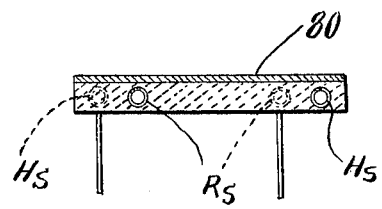
INVENTORS.
Emmett S. Watson
BY Michael J. O'Neill
ATTORNEY.

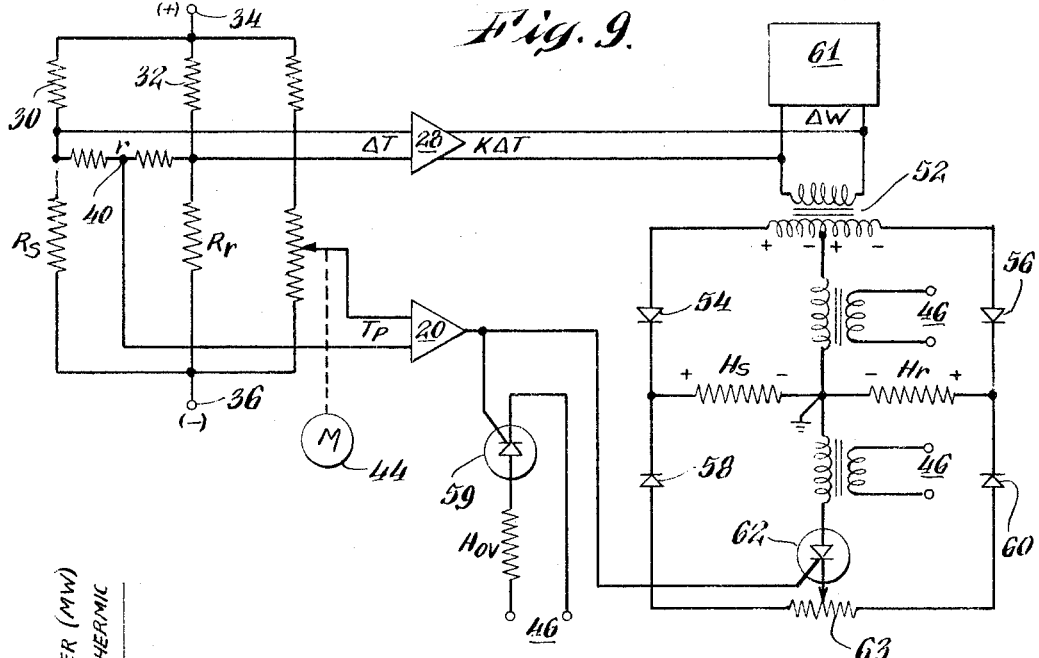

United States Patent Office 3,263,484
Patented August 2, 1966

3,263,484
DIFFERENTIAL MICROCALORIMETER
Emmett S. Watson, Ridgefield, and Michael J. O'Neill,
West Redding, Conn., assignors to The Perkin-Elmer
Corporation, Norwalk, Conn., a corporation of New
York
Filed Apr. 4, 1962, Ser. No. 185,499
24 Claims. (Cl. 73—15)

This invention relates to thermal analysis of samples and, more particularly, to differential thermal analysis.

Differential thermal analysis is an old and well-known method for the analysis of materials. Basically, the method consists of simultaneously applying heat to a sample material and a reference material. As the sample material goes through various physical and chemical changes, such as crystallization, melting, freezing, oxidation, etc., its temperature is affected by the changes in internal energy. The differences in temperature between the sample and reference are recorded and, from this data, calculations may be made for determining the internal energy changes occurring in the sample.

In typical conventional differential thermal analysis instruments, relatively large quantities of sample and reference materials are placed in holes drilled into a metal block. Heat is applied to the block so that its temperature increases linearly with time. Three thermocouples are utilized to measure the temperatures existing (1) in the block, (2) at the center of the sample, and (3) at the center of the reference material. So long as the sample remains thermally inert and is thermally equivalent to the reference, the temperature at the center of the sample will track the temperature at the center of the reference. Both temperatures will lag the block temperature by an amount dependent on the heating rate and on sample thermal conductivity, size, geometry, etc. This results in temperature gradients within the sample and reference volumes. When thermal transitions occur in the sample, they must first begin on the outside surface of the sample, as that is where the transition temperature is first reached. In an endothermic transition for example, the outer part of the sample soaks up heat from the block and delays the temperature rise at the center. When the transition is finally complete, the system returns to a state of dynamic equilibrium. In a roughly similar manner, exothermic transitions propagate heat toward the center of the sample resulting in a sample temperature which, for some period, is higher than the reference temperature. The difference in temperature between the sample and the reference is recorded against time or temperature. The location and polarity of the resulting peaks indicate the temperature and the type of transition. From the area of the peaks, the transition energy may be calculated, but with difficulty and poor accuracy.

It will be obvious that data from the prior-art instruments discussed above are highly dependent on instrumental and operational factors. For example, if the temperature of the metal block is programmed too fast, the peaks will be large and sharp, but shifted too high on the temperature abscissa scale. If the program is too slow, the temperature scale will be accurate, but the peaks will be too small. These undesirable effects occur because, during the thermal transitions, the system is not in dynamic equilibrium. Conventional instruments require such a lack of equilibrium between the temperatures of the reference and the sample in order to operate. As a result, the data from such instruments are neither reproducible nor fundamental, since the transitions cannot be isothermal.

A further disadvantage is that large samples are required—on the order of a few hundred milligrams—making the method difficult or impossible for use in microanalysis.

Another technique has been proposed by M. Charles Eyraud in a series appearing in the French Academy of Sciences publication Seance for April 5, 1954, January 24, 1955, and February 21, 1955. However, his technique is limited in usefulness by the requirement that the materials be comminuted, mixed with an electrically conductive substance, and heated by direct passage of an electric current. Consequently, preparation is difficult, sample size is still large, and electrical phenomena are superimposed on the thermal phenomena to be observed.

It is, therefore, a primary object of this invention to provide an improved method and apparatus for differential thermal analysis.

Another object is to provide an instrument capable of analyzing much smaller samples than existing apparatus.

Another object is to provide such an instrument which has a highly reproducible output.

Another object is to provide such an instrument wherein the induced transitions are isothermal.

Another object is to provide such an instrument having greatly improved resolution of output peaks.

Another object is to provide such an instrument wherein the output may be recorded directly as differential power.

Another object is to provide such an instrument wherein the area of the resulting peak is an accurate measure of transition energy.

Another object is to provide such an instrument wherein electrical current does not pass through the sample material.

Another object is to provide such an instrument capable of increased speed of analysis.

The manner in which the above objects are achieved will be more apparent from the following description, the appended claims, and the figures of the attached drawings wherein:

FIG. 5 is a perspective view of a sample unit suitable for use with this invention;

FIG. 6 is a cross section taken along line 6—6 of FIG. 5;

FIG. 7 is a plan view of a sample pan usable with this invention;

FIG. 8 is a cross section taken along line 8—8 of FIG. 7;

FIG. 9 is a schematic diagram of a variation of the invention;

FIG. 10 is an illustration of a typical recording obtained using apparatus of the present invention; and FIG. 11 is a typical recording obtained by means of prior art apparatus.

The objects of this invention are achieved by changing the temperature of a sample material in accordance with a desired program by varying the temperature of an external medium in heat exchanging relationship with the sample. The difference in temperature between the sample and program is measured and the applied heat is varied to maintain zero temperature difference therebetween. The power required to maintain the zero temperature difference is then measured.

Figure 1:
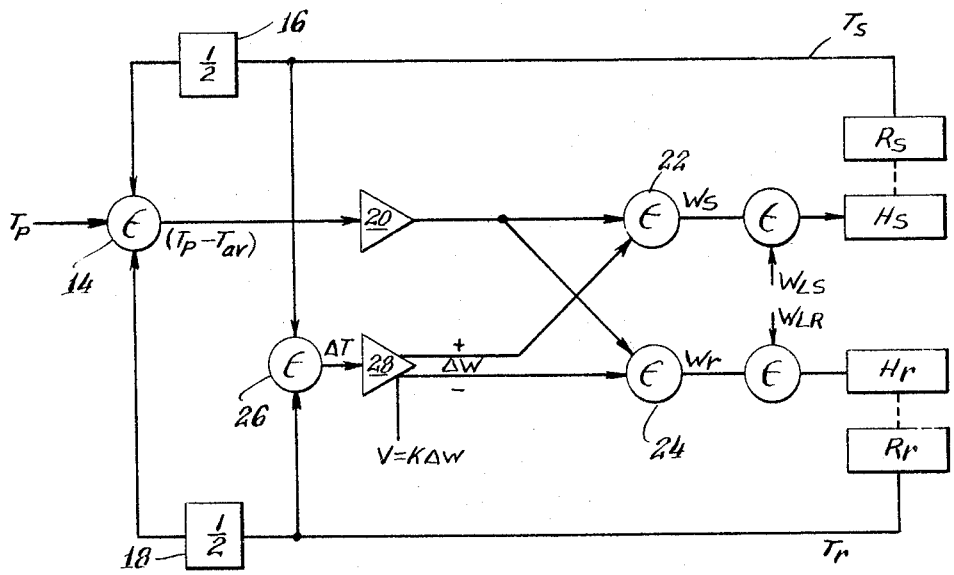
FIG. 1 is a block diagram of a differential thermal analysis apparatus in accordance with the invention.

By more particular reference to the drawings, FIG. 1 illustrates in simplified block diagram form an exemplary apparatus for the practice of this invention. As will be seen by reference thereto, a setpoint temperature signal $T_p$ is applied a suitable subtractive circuit 14 of any of the types well-known to those skilled in the art. Additional signals are fed into circuit 14 from each of divider circuits 16 and 18. Circuit 16 receives a signal $T_s$ proportional to the temperature of the sample and circuit 18 receives a signal $T_r$ proportional to the temperature of the reference. The output signal from circuit 14 is thus proportional to $$T_p - \frac{T_s + T_r}{2}$$

This signal represents the desired set point temperature minus the average temperature ($T_{av}$) of the sample and reference holders. This error signal is amplified by amplifier 20 and is applied equally to summing circuits 22 and 24.

Signals proportional to the temperatures of the sample and reference are also fed to circuit 26 which produces an output signal proportional to the temperature difference $\Delta T = T_s - T_r$ between the two materials. This differential signal is amplified by amplifier 28 and produces an output $\Delta W$ which is applied to circuits 22 and 24. $W_{Ls}$ and $W_{Lr}$ represent disturbances caused by changes of state in the sample and reference materials. It will be noted that the circuit of FIG. 1 employs two control loops. One loop, including amplifier 28, compares $T_s$ and $T_r$ and continuously tries to make them equal, while producing a readout voltage—proportional to $$\Delta W = W_s - W_r$$

This loop is unaware of changes in the average temperature. The other loop, including amplifier 20, measures the average temperature, compares it with the set point $T_p$, and adds power equally to the sample and reference to null the difference. This loop is insensitive to $T_s - T_r$ and $T_s - T_r$ is unaffected by the output of the $T_{av}$ amplifier 20.

Figure 2:
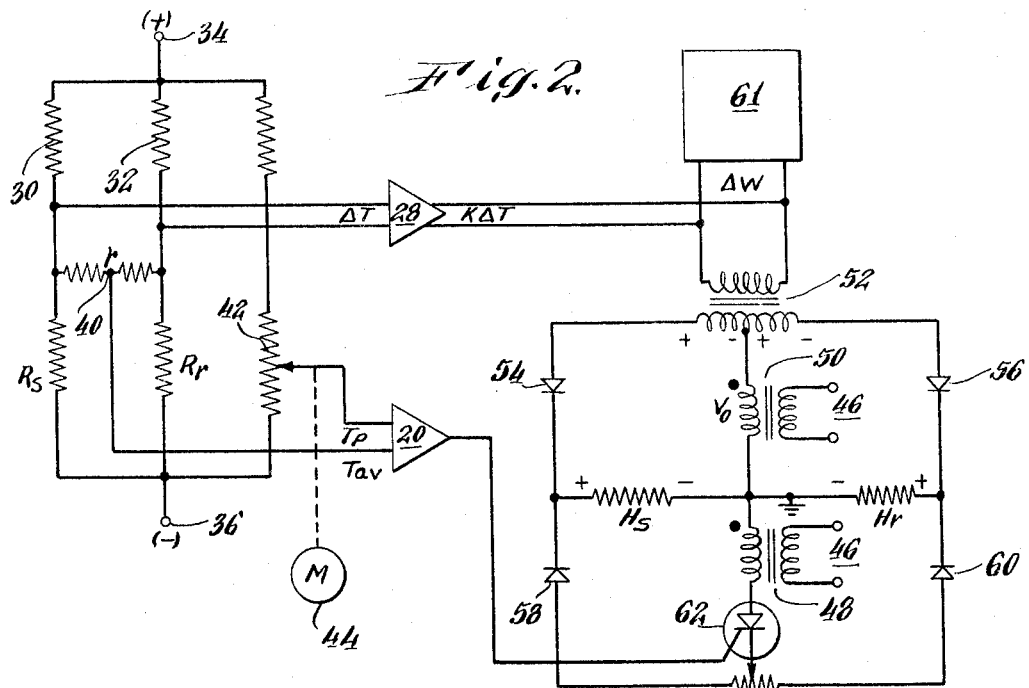
FIG. 2 is a schematic diagram of the embodiment of FIG. 1.

A more complete schematic illustration is shown in FIG. 2. Temperature measuring resistors $R_s$ and $R_r$ are provided in close physical relationship to the sample and reference to provide output signals proportional to their temperatures. In this embodiment, the heating function is provided by individual heaters—$H_s$ for the sample and $H_r$ for the reference. A Wheatstone bridge circuit including fixed resistors 30 and 32 and temperature measuring elements $R_s$ and $R_r$ provides error signal $\Delta T$ (i.e., $T_s - T_r$) to amplifier 28. A supply voltage is applied to the bridge circuit at terminals 34 and 36. Resistor $r$ is connected across the bridge and has a center tap 40 providing a signal to a second amplifier 20 proportional to the average temperature (i.e., $T_{av}$) of the sample and the reference. A suitable potentiometer 42 connected across the power supply is driven by a motor 44 to provide a programmed input $T_p$ to amplifier 20. The output of amplifier 20 thus controls the power necessary to make $T_{av} = T_p$. Both of amplifiers 20 and 28 include choppers for generating pulsed outputs.

A suitable alternating current source 46 supplies power to an average temperature control transformer 48 and a biasing transformer 50 in the differential temperature control circuit. The polarities of transformers 48 and 50 are in opposition relative to $H_s$ and $H_r$. A third transformer 52 receives the output $\Delta W = k \Delta T$ of differential temperature amplifier 28 and its secondary is provided with a center tap connected to one side of the transformer 50 secondary.

Four diodes 54, 56, 58, and 60 are connected into the outputs of transformers 48 and 50 to control the average temperature and the differential temperature.

The circuit illustrated in FIG. 2 solves a difficult problem in the measurement of differential power. The problem is: how to measure the difference in power usage of two electrical elements? One solution would be to utilize a thermal wattmeter in conjunction with each of heating elements $H_s$ and $H_r$. However, although this approach is practically realizable, it has certain disadvantages in that such wattmeters would need to be very sensitive and well matched to one another, both electrically and thermally. A second solution would be to subtract the squares of the voltages across the two elements $(E_s^2 - E_r^2)$, assuming equal resistances. However, this approach requires complex squaring circuits.

By reference to the circuit of FIG. 2, it will be noticed that a "biasing" voltage $V_0$ is applied equally to $H_s$ and $H_r$ from transformer 50. The power supplied to each element in the absence of a voltage from transformer 52, is $V_0^2/2R$ where R is the resistance of the element.

If an in-phase voltage, $2\Delta V$ exists across the secondary of transformer 52, the power supplied to $H_s$ is $$W_s = \frac{(V_0 - \Delta V)^2}{2R}$$

and that supplied to $H_r$ is $$W_r = \frac{(V_0 + \Delta V)^2}{2R}$$

The differential power then becomes:

$$\Delta W = W_s - W_r = \frac{2V_0 \Delta V}{R}$$

It will be apparent that this equation for differential power contains no squared elements. Furthermore, so long as $V_0$ remains a constant, $\Delta W \approx \Delta V$. The great advantages of such a simple relationship for the measurement of differential power will be immediately apparent. Recorder 61 is connected as shown to record $\Delta V$ as a measurement of differential power.

In order to change or "program," the average temperature of $H_s$ and $H_r$, $V_0$ is kept constant during one-half cycle and all measurements are performed during this half-cycle. During the other half of each cycle, additional heating power may be supplied as desired. One way of providing such power would be to increase $V_0$ during the half-cycle. However, in the illustrated embodiment, a separate source 48 is employed in order that a silicon controlled rectifier 62 may be used without affecting the previously mentioned circuit. In effect, the function of diodes 54, 56, 60 is to decouple the heating and measuring circuits. The firing angle of the silicon controlled rectifier 62 is directly controlled from amplifier 20.

In using this invention, a sample material is placed on a metal foil pan which rests upon a small hot plate of the type illustrated in FIGS. 5–8. The sample and reference plates may be contained within a suitable enclosure 83. Sample plate 80 is constructed with a resistive heating element $H_s$ and a resistive temperature sensitive element $R_s$ in close proximity. The reference plate 82 contains similar elements $H_r$ and $R_r$. The particular construction of the plates employed is subject to many variations and modifications, but one particular embodiment will be described in detail infra.

Motor 44 (FIG. 2) is started to control the travel of the wiper against potentiometer 42. At the same time, this motor may control the abscissa of a suitable recording chart 61. As the potentiometer wiper moves along potentiometer 42, the output signal from amplifier 20 is caused to vary. For example, this signal may increase. As the signal increases, controlled rectifier 62 will fire earlier in the half-cycle, causing the power supplied by transformer 48 to both of heaters $H_s$ and $H_r$ to increase. This causes an increase of temperature common to both plates to maintain $T_{av} = T_p$. At some point during this temperature rise, various changes may occur in the sample material. For purposes of illustration, we may assume that the material begins to melt. As melting is an endothermic reaction, the temperature of the sample plate begins to lag the temperature of the reference plate. This causes temperature sensitive resistors $R_s$ and $R_r$ to become unbalanced resulting in an error signal $\Delta T$ and a signal $k\Delta T$ from amplifier 28 proportional to the unbalance. This, in turn, causes an increase in the current through $H_s$ and the decrease in that through $H_r$. The temperature of the sample is thereby raised to bring it back into equalization with the reference. At the same time, the difference in power $\Delta W \approx k\Delta T$ required to accomplish the equalization is recorded by a suitable recorder 61.

An additional feature of this invention is the baseline straightening potentiometer 63 shown in FIG. 2. As the average temperature of the two heaters is programmed by means of motor 44, the individual temperatures should increase equally in the absence of a sample. However, in practice this ideal condition is not achieved. Slight variations in material, geometry, etc. between the reference and sample heaters cause differences in heat dissipation. As the average temperature increases, a temperature unbalance between the heaters appears which grows steadily greater, thus causing "baseline slope." By proper adjustment of potentiometer 63, this slope may be eliminated and the baseline straightened.

Figure 3:
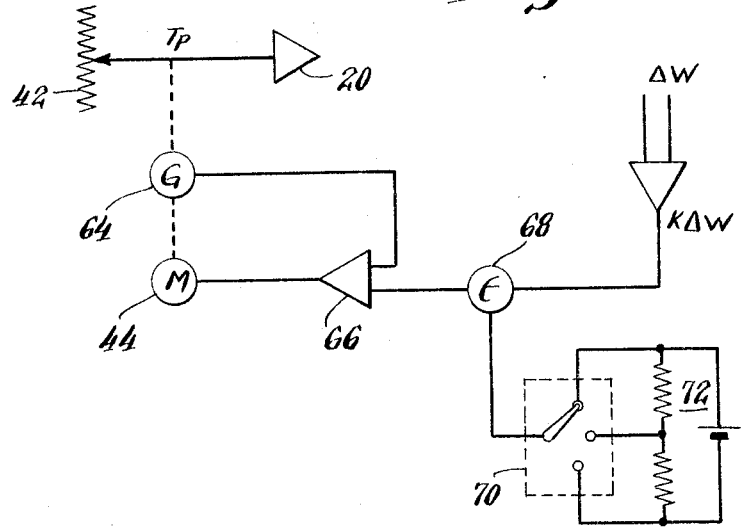
FIG. 3 is a schematic diagram of a variation of the apparatus of FIG. 2.

As a variation of this technique, there is illustrated in FIG. 3 a speed suppression circuit for the control of the abscissa motor 44. Motor 44, which also controls the setpoint temperature $T_p$, is further connected to tachometer generator 64. The output of generator 64 is sent through a closed loop to motor control amplifier 66. The other input to amplifier 66 is the power difference signal $\Delta W$ from transformer 52. This signal is run through a subtraction circuit 68 where the amount of suppression desired is added to the speed previously selected by a multiposition speed selector switch 70 in a suitable speed selection circuit 72. It will be seen that with the embodiment illustrated in FIG. 3 the speed of the chart and of the change in temperature is modified by the differential signal obtained between the sample and the reference. By means of speed suppression, the program speed is slowed during periods of sharp transitions. In this way, dynamic errors are minimized.

Up to this point, this disclosure has been limited to a description of differential thermal analysis wherein temperatures are controlled independently of the surrounding environment. Two additional systems may also be employed which may be denominated "oven heating" and "bootstrapping."

OVEN HEATING

Figure 4:
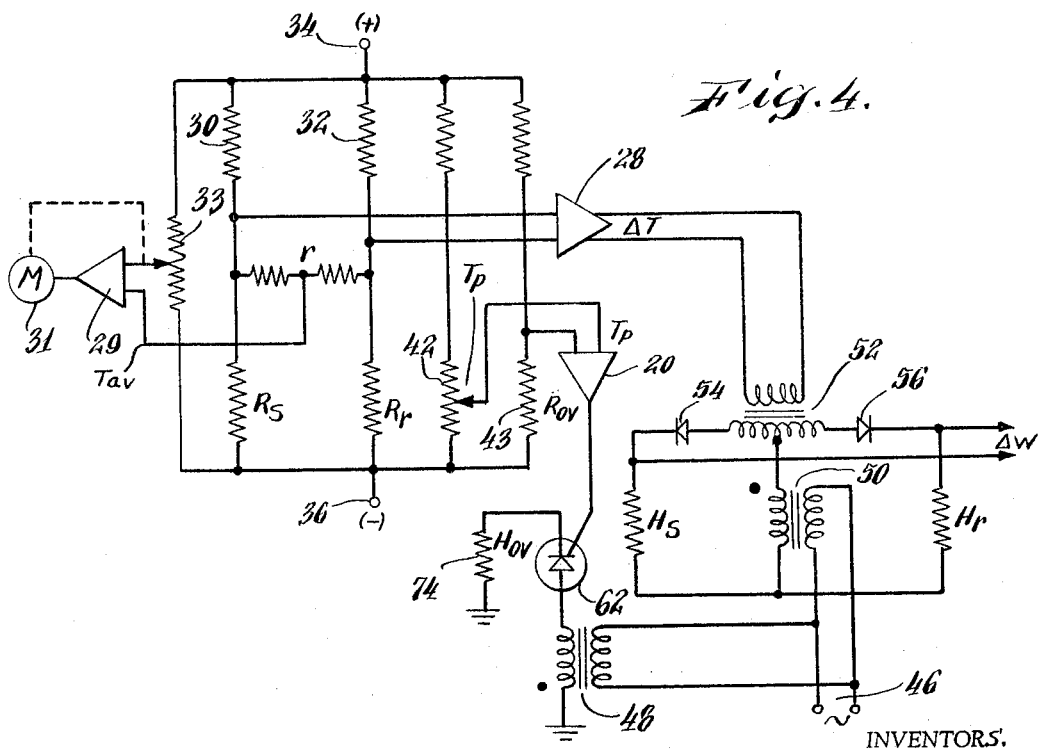
FIG. 4 is a schematic diagram of yet another embodiment of the invention.

Oven heating will be more readily understood by reference to FIG. 4. By means of this technique, the enclosure temperature is programmed and not the individual heaters. The sole function of $H_s$ and $H_r$ thus becomes the application of the necessary differential power. The sample and reference plates are placed in a suitable oven or enclosure (83 of FIG. 5) and the temperature of the enclosure is measured by sensing element 43 and controlled by heater 74. In many respects, the circuit of FIG. 4 is substantially identical to that of FIG. 2 and like elements are identified by similar reference numerals.

The oven heating technique has certain advantages over individual plate temperature control that may be desirable under certain circumstances. These include: (1) the presence of minimum thermal gradients in the sample; (2) fewer convection currents within the enclosure; (3) no condensation of effluents within the enclosure; (4) no necessity for accurate temperature control; and (5) an automatic speed suppression effect. The latter advantage is a direct result of the independent control of the differential temperature and the programmed temperature. Assume, for example, a linearly increasing average temperature program. As the enclosure temperature begins to rise, the plate temperatures also begin to rise. An initial power input to both plates is provided by transformer 50 to raise the plate temperatures slightly above ambient (for example, 5° C.). The plate temperatures then tend to "float" at this level above ambient (in this embodiment, ambient is really the programmed temperature of the oven). Assume, then, that an endothermic reaction occurs on the sample plate. As the sample absorbs heat, its rate of temperature increase decreases. The reference plate, however, continues to track the enclosure temperature. The differential temperature created will then shift power from the reference to the sample plate and thereby slow down the reference plate as well. So long as the reaction continues, both plates will program at a speed less than that of the ambient so that, when the reaction is complete, the plates might be only 2° C. above ambient. The temperatures will then accelerate until they reach their point of equilibrium temperature once again. As the thermal impedance from plates to ambient is relatively high and a long time constant is involved, reactions can take place on the plates with little interference from the enclosure. If the total power to the plates was constant, they would be left with an energy deficit corresponding exactly to the reaction energy. However, the total power to $H_s$ and $H_r$ (FIG. 4) increases with an unbalance and this effect tends to compensate for the total energy loss. Whatever the total energy loss or final temperatures may be, the width of the recorded peak is a real indication of the temperature span of the reaction as a result of this automatic speed suppression effect. A separate loop comprising amplifier 29, motor 31, and potentiometer 33 measures and records $T_{av}$. The motor 31 may also serve to provide the abscissa drive for a recorder or other suitable output means.

BOOTSTRAPPING

Still another technique for programming the differential thermal analysis system of this invention may be denominated "bootstrapping." The bootstrapping technique bears a resemblance to oven heating in that the enclosure temperature is varied. However, the primary distinction is that, in this method, the enclosure temperature is caused to follow the plate temperatures although it lags them slightly. The sample and reference plates are programmed by an average temperature circuit as previously discussed relative to the circuit of FIG. 2. In addition, an enclosure temperature circuit arranged to follow $T_p$ is provided. Thus three control loops are required rather than two.

One of the primary advantages gained by bootstrapping is that, since the enclosure is not serving to heat the plates, the plates may have a low heat dissipation coefficient. This results in increased thermal resistance from plates to enclosure and, consequently, the maximum plate temperature increase for a given differential power input.

Many advantages of the oven heating system are also retained. For example, thermal gradients in the sample are kept to a minimum, and condensation of effluent vapors is prevented.

The operation of the bootstrapping technique will be explained by reference to FIG. 9. It will be noted that this circuit is identical to that of FIG. 2 but with the addition of enclosure heater $H_{ov}$ supplied from source 46 and controlled by rectifier 59 which is responsive to the output of amplifier 20. Similar numerals are used to designate like elements of FIGS. 2 and 9. By this arrangement, it will be noted that the actual power being supplied to $H_s$ and $H_r$ becomes the error signal for controlling the enclosure temperature. In effect, this circuit "looks" at the average power being supplied to the heaters and adjusts the enclosure temperature to make this power requirement approach zero. The consequent decrease in temperature gradient results in the advantages set forth above.

In performing an analysis by any of the foregoing methods, the sample to be analyzed will ordinarily be weighed first. The small metal foil pan in which the sample will be contained during analysis is placed on a microbalance and its tare weight determined. Sample material in the desired amount is then placed in the pan and weighed. Since best results are obtained if the sample is in intimate thermal contact with the pan during analysis; one of several means of achieving this condition is used in cases where the sample in its original form is a loose powder. In some cases, the sample is premelted and refrozen into a thin film on the pan surface. This may be done outside the instrument or within the instrument by making a preparatory run up and down in temperature prior to the analytical run. In other cases, the sample is formed into a thin film by solvent dispersion. With some samples, these methods are not possible or permissible. In such cases, the sample is simply compacted mechanically into a thin layer over the surface of the pan.

The pan containing sample is placed on the sample plate in the instrument. A similar pan may be placed on the reference plate to compensate for the thermal capacity and thermal dissipation contributions of the sample pan. If these factors remain uncompensated, they may introduce dynamic and static thermal mismatch between the sample and reference plates and cause undesirable baseline shift and baseline drift. Thermally inert material may be placed in the reference pan for still more exact compensation, but this is not ordinarily necessary and the reference plate and pan serve as the reference "material."

Environmental conditions within the enclosure are set up as desired for the analysis. This may mean evacuating the enclosure, passing inert or deliberately reactive gas through the enclosure at various pressures, presaturating the enclosure with sample effluent vapor, etc.—depending upon the type of thermal phenomena being analyzed and the influence of environmental factors on these phenomena.

The starting temperature for the run is set and the temperature programming speed selected. When the programmer is turned on, the instrument automatically increases the temperature of the sample and reference plates linearly with time at the selected programming speed. Fast speeds may be used to "survey" a wide temperature range in a short time. With the temperature ranges of interest thus determined, slower speeds may be used over these ranges in order to minimize dynamic errors and thus increase accuracy and resolution.

While the temperature of the sample is being scanned, the instrument records the difference in power required by the sample and reference structures to maintain their temperatures equal. Since the sample and reference are otherwise substantially identical thermally, such difference in power is the latent power of transition in the sample. This differential power is recorded as ordinate on a linear time abscissa recorder. Since the temperature program rate is also linear, the abscissa is also proportional to temperature and can be so calibrated. The significance of the record is then that:

(1) The ordinate curve is proportional to the specific heat of the sample as a function of temperature.

(2) The temperature abscissa locations and ordinate polarities of the various peaks are characteristic of various transitions occurring in the sample, thus aiding in sample identification.

(3) The shape of the peaks may indicate variations in the time or temperature dependency of transition rate or equilibrium—such as might be caused by variation in sample purity.

(4) The areas of the peaks are proportional to transition energies and may be used for the quantitative analysis of mixtures of known materials.

With appropriate controls, the temperature may be programmed up or down. Reversible transitions such as fusion may thus be observed from both directions. Use of cooling devices will even allow analyses to be performed below room temperature.

*Example*

FIG. 10 illustrates a typical recording obtained by using the method and apparatus of this invention. The material analyzed was dotriacontane, $CH_3(CH_2)_{30}CH_3$, a straight chain hydrocarbon wax which exhibits a solid state chain rotational transition a few degrees below its melting point. The sample size was 1.5 mg. The temperature programming speed was 10° C. per minute, increasing from an initial temperature of 50° C. to 90° C. Ordinate peak 90 resulted from the solid state transition. Peak 92 resulted from the melting. The area of each peak is directly proportional to its respective heat of transformation. The combined peak areas represent a total heat of fusion of about 100 millicalories, corresponding to the figure of 65 calories per gram total heat of fusion reported in the literature.

FIG. 11 illustrates a typical recording obtained by using prior art methods and apparatus. The material analyzed is also dotriacontane, except that a much larger sample size, 750 milligrams, was required. The temperature programming speed was much slower, 1° C. per minute. The solid state transition peak 94 and the melting peak 96 are not well resolved. The areas of peaks 94 and 96 are not directly proportional to their respective heats of transformation since the ordinate deflection is differential temperature which may not be proportional to differential power, depending on whether or not sample thermal conductivity changes with change of state and other factors.

Comparison of FIGS. 10 and 11 reveals the advantages over the prior art to be derived from the application to thermal analysis of the methods and apparatus of this invention. In summary these advantages are:

(1) Increased sharpness and resolution of heat effects.
(2) Direct quantitative measurement of heat effects.
(3) Faster analysis.
(4) Smaller sample size.

These advantages accrue from the fact that in the method and apparatus of this invention, the sample is always maintained in a condition of dynamic thermal equilibrium. In the prior art, tpyified by conventional differential thermal analysis, the sample is not in such a desired condition since the differential temperature ordinate readout requires that a temperature gradient be developed during transitions.

An additionl advantage is the absence of the requirement found in typical prior art that the sample be in contact with or mixed with an electrically conducting material which may introduce undesired electrochemical effects.

Other embodiments, variations, and modifications will be apparent to those skilled in the art. For example, the average temperature may be held constant and other environmental conditions such as gas composition, pressure, etc. may be varied. Also, truly "differential" analyses may be performed, i.e., the thermal differences between two active materials such as an impure sample and a pure reference standard may be measured.

It will be apparent to those skilled in the art that a single electrical element may function as both a heater and as a temperature sensor. Although only heating elements have been illustrated, it is also to be noted that relative heat flow may be either to or from the sample and reference. For example, thermoelectric heating and cooling elements may be employed to advantage in this invention.

Where appearing in the following claims, the terms "reference material" shall be construed to include either the combination of a reference heater and a separate reference material, a reference heater and an empty "pan," or the reference heater alone.

This invention is to be construed as limited only by the following claims.

We claim:

1. The method of performing an analysis which comprises varying the environment of a sample material; measuring the resulting difference in temperature between said sample material and a reference material; varying the relative flow of thermal energy between both said sample and said reference material relative to at least one external energy source in response to said difference in temperature in such manner as to equalize the temperature of said sample and said reference material; and independently varying an additional heat flow to both said sample and reference material in such manner as to cause them both to attain the same desired temperature; and measuring said first-mentioned relative flow of thermal energy.

2. The method of claim 1 wherein said measuring step is continuously performed during variation of said environment.

3. The method of claim 2 wherein at least a part of said external energy source is in physical contact with the surface of said sample material.

4. The method of claim 3 wherein variation in said relative flow of thermal energy is accomplished by varying the temperature of said part of said external energy source by an electrical current.

5. The method of claim 4 wherein said electrical current is measured as a measure of said flow of heat.

6. The method of claim 5 wherein said environment is temperature.

7. The method of claim 6 wherein the temperature of said reference material changes in correspondence to variation in said environment.

8. Apparatus for performing an analysis of a sample material which comprises: a reference material; means for varying the environment of said sample material; means for measuring the difference in temperature between said sample material and said reference material; an external source of energy; means for varying the relative flow of thermal energy both between said sample material relative to said external source and between said reference material relative to said external source in response to said difference in temperature in such manner as to equalize the temperature of said sample and said reference material; means for independently varying equally an additional heat flow to both said sample and reference material in such manner as to cause them both to attain the same desired temperature; and means for measuring the difference in said first-mentioned relative flow of thermal energy between that supplied to said sample material and that supplied to said reference material.

9. The apparatus of claim 8 wherein part of said external energy source is an electrical thermal element.

10. The apparatus of claim 9 wherein said means for varying the relative flow of thermal energy comprises electrical circuit means controlling the electrical energy supplied to said thermal element.

11. The apparatus of claim 10 wherein said means for varying the environment comprises temperature varying means comprising at least part of said means for independently varying said additional heat flow.

12. Analyzing apparatus which comprises a sample holder adapted to support sample material; a reference material; environmental control means operative to apply substantially the same environmental conditions to each of said sample material and reference material; environment adjusting means operatively connected to vary said environmental control means and the associated environment; first temperature control means adjacent said sample material and in heat flow relationship therewith; second temperature control means adjacent said reference material and in heat flow relationship therewith; first temperature sensing means adjacent said sample material; second temperature sensing means adjacent said reference material; electrical circuit means responsive to said first and second temperature sensing means and operative to adjust said first and second temperature control means to substantially equalize the temperatures of said sample material and reference material; and measuring means responsive to the power supplied to said temperature control means.

13. The apparatus of claim 12 wherein speed control means, responsive to said power supplied to said temperature control means, are operatively connected to said environment adjusting means, so as to slow the rate at which said environment is varied according to the quantity of said power.

14. The apparatus of claim 12 wherein said environment is temperature and wherein said environmental control means comprise temperature changing means.

15. The apparatus of claim 14 wherein said temperature changing means comprise a heater for each of said sample and reference materials.

16. The apparatus of claim 14 wherein said temperature changing means comprises a common heater for both of said sample and reference materials.

17. Differential thermal analysis apparatus which comprises an electrically heated sample holder and an electrically heated reference holder; sample temperature sensing means adjacent said sample holder; reference temperature sensing means adjacent said reference holder; temperature programming means responsive to the average temperature of said sample and reference temperature sensing means and adapted to supply heat substantially equally to said sample and reference holders in accordance with a desired temperature program; temperature equalizing means responsive to the temperature difference between said sample and reference temperature sensing means and adapted to supply differential electrical thermal power to said sample and reference holders in amounts tending to null said difference; and means for measuring said differential power.

18. The apparatus of claim 17 wherein each of said sample and reference temperature sensing means comprises an electrical resistance element.

19. The apparatus of claim 18 wherein said temperature equalizing means is an electrical circuit comprising transformer means energized by an amount proportional to said temperature difference, the output of said transformer means being in electrical series relationship with both of said sample and reference holders; and biasing power supply means electrically connected between a junction common to both of said holders and a tap on said transformer means.

20. The apparatus of claim 19 wherein at least a portion of said means for measuring differential power measures a voltage proportional to that across said transformer means.

21. The apparatus of claim 20 wherein at least a portion of said equally supplied heat is electrically applied to each of said sample and reference holders.

22. The apparatus of claim 21 wherein at least a portion of said equally applied heat is supplied from a supplemental heater means responsive to said temperature programming means.

23. The apparatus of claim 20 wherein substantially all of said equally applied heat is electrically applied to each of said sample and reference holders.

24. The apparatus of claim 20 wherein substantially all of said equally applied heat is applied to an enclosure common to both of said sample and reference holders.

References Cited by the Examiner

UNITED STATES PATENTS 2,986,028  5/1961  Shawhan _____ 73—15

OTHER REFERENCES

Eyraud: Academic des Sciences Comptes Rendus, April–June 1954, pages 1511–1512.

Eyraud et al.: Academic des Sciences Comptes Rendus, January–March 1955, pages 423–425 and 862–864.

Clarebrough et al.: Proceeding of the Royal Society of London, volume A–215, November–December of 1952. Pages 507–524 pertinent.

LOUIS R. PRINCE, *Primary Examiner.*

ROBERT EVANS, RICHARD C. QUEISSER,
*Examiners.*

D. O. WOODIEL, *Assistant Examiner.*